(12) United States Patent
Liao et al.

(10) Patent No.: US 11,924,914 B2
(45) Date of Patent: Mar. 5, 2024

(54) NETWORK SLICE CONTROL METHOD AND APPARATUS, AND COMPUTER READABLE STORAGE MEDIUM

(71) Applicant: ZTE Corporation, Shenzhen (CN)

(72) Inventors: Guoqing Liao, Shenzhen (CN); Jie Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 115 days.

(21) Appl. No.: 17/260,256

(22) PCT Filed: May 30, 2019

(86) PCT No.: PCT/CN2019/089363
§ 371 (c)(1),
(2) Date: Jan. 14, 2021

(87) PCT Pub. No.: WO2020/010957
PCT Pub. Date: Jan. 16, 2020

(65) Prior Publication Data
US 2021/0306272 A1 Sep. 30, 2021

(30) Foreign Application Priority Data
Jul. 13, 2018 (CN) .......................... 201810769520.7

(51) Int. Cl.
*H04W 8/04* (2009.01)
*H04L 41/0893* (2022.01)
(Continued)

(52) U.S. Cl.
CPC ........... *H04W 8/04* (2013.01); *H04L 41/0893* (2013.01); *H04L 41/5051* (2013.01);
(Continued)

(58) Field of Classification Search
CPC . H04L 47/14; H04L 41/0893; H04L 41/5051; H04W 16/02; H04W 28/10; H04W 28/24; H04W 8/04
(Continued)

(56) References Cited

U.S. PATENT DOCUMENTS

| 2015/0043382 | A1  | 2/2015 | Arora et al. |
| 2017/0079059 | A1* | 3/2017 | Li ........................ H04W 16/02 |
| 2019/0268973 | A1* | 8/2019 | Bull .................. H04W 28/0268 |

FOREIGN PATENT DOCUMENTS

| CN | 1929401 A | 3/2007 |
| CN | 107360598 A | 11/2017 |

(Continued)

OTHER PUBLICATIONS

The State Intellectual Property Office of People's Republic of China. First Search Report for CN Application No. 201810769520.7 and English translation, dated Oct. 11, 2021, pp. 1-4.
(Continued)

*Primary Examiner* — Obaidul Huq
(74) *Attorney, Agent, or Firm* — Vivacqua Crane, PLLC

(57) ABSTRACT

A method and apparatus for controlling a network slice, and a non-transitory computer-readable storage medium are disclosed. The method includes: binding a network slice established in a bearer network on a basis of a quality of service (QoS) requirement to a user network interface or a virtual sub-interface of the bearer network, where a plurality of network slices with different QoS are bound to different user network interfaces or virtual sub-interfaces, and when a first network slice of the bearer network and a network slice group of a non-bearer network are bound to a same user network interface or a same virtual sub-interface, QoS of the first network slice is same as QoS of the network slice group.

8 Claims, 4 Drawing Sheets

(51) Int. Cl.
  *H04L 41/5051* (2022.01)
  *H04W 16/02* (2009.01)
  *H04W 28/10* (2009.01)
  *H04W 28/24* (2009.01)

(52) U.S. Cl.
  CPC ........... *H04W 16/02* (2013.01); *H04W 28/10* (2013.01); *H04W 28/24* (2013.01)

(58) Field of Classification Search
  USPC .................................................. 370/229, 235
  See application file for complete search history.

(56) References Cited

FOREIGN PATENT DOCUMENTS

| | | |
|---|---|---|
| CN | 108141412 A | 6/2018 |
| CN | 108243483 A | 7/2018 |
| JP | 2016521529 A | 7/2016 |
| WO | 2017121454 A1 | 7/2017 |
| WO | 2018059689 A | 4/2018 |
| WO | 2018059689 A1 | 4/2018 |

OTHER PUBLICATIONS

The State Intellectual Property Office of People's Republic of China. First Office Action for CN Application No. 201810769520.7 and English translation, dated Sep. 26, 2021, pp. 1-3.
Korean Intellectual Proprty Office. First Office Action for KR Application No. 10-2021-7003589 and English translation, dated Jan. 11, 2022, pp. 1-11.
European Patent Office. Extended European Search Report for EP Application No. 19833548.1, dated Jul. 7, 2021, pp. 1-10.
Grossman et al. Deterministic Networking Use Cases; draft-ieft-detnet-use-cases-15.txt; internet-draft: internet engineering task force, internet engineering task force, IETF; standardworkingdraft, internet society (ISOC) 4, Rue des Falaises CH-1205 Geneva, Switzer, No. 15, Apr. 3, 2018 (Apr. 3, 2018), pp. 1-90, XP015125806, [retrieved on Apr. 3, 2018].
International Search Report and Written Opinion for the International Patent Application No. PCT/CN2019/089363 dated Aug. 1, 2019.
ETRI. "Solution for Network Function Selection within a Network Slice" SA WG2 Meeting #114 S2-161447, Apr. 5, 2016 (Apr. 5, 2016) pp. 1 and 2.

* cited by examiner

NETWORK SLICE CONTROL METHOD AND APPARATUS, AND COMPUTER READABLE STORAGE MEDIUM

CROSS-REFERENCE TO RELATED APPLICATION

This application is a national stage filing under 35 U.S.C. § 371 of international application number PCT/CN2019/089363, filed May 30, 2019, which claims priority to Chinese patent application No. 201810769520.7, filed Jul. 13, 2018. The contents of these applications are incorporated herein by reference in their entirety.

TECHNICAL FIELD

The present application relates to, but not limited to, the field of network technology, and in particular, to a method and apparatus for controlling a network slice, and a computer-readable storage medium.

BACKGROUND

The 5th generation (5G) communication traffics has the characteristics of multi-scenarios and differentiation. For example, mobile Internet traffics focus on bandwidth, autonomous driving traffics require low latency and high reliability, and Internet of Things traffics need to support a huge number of connections. In this regard, 5G wireless access network and core network have carried out functional reconstruction, changed the physical deployment position of equipment processing units according to traffic types, and built independent end-to-end logical networks for different types of traffics on the same physical network through slicing.

At the same time, 5G is an open network, which can satisfy application requirements for vertical industries and leasing traffics. As a part of a 5G end-to-end traffic path, a 5G bearer network is required to support the traffic isolation and independent operation and maintenance requirements of 5G slices, and to allocate different bearer network slices for different types of traffics.

Network slicing is to create a plurality of virtual networks, or slices, on a shared physical network resource, using the virtualization technology. Network slicing can slice the physical network into corresponding virtual networks according to different types of bearer traffics or different tenants (for example, slicing is performed according to government and enterprise customers, home customers, 5G Enhance Mobile Broadband (eMBB) traffics, Ultra-Reliable and Low-Latency Communications (uRLLC) traffics, and massive machine type of communication (mMTC) traffics), so as to satisfy the requirements of different types of traffics.

SUMMARY

At least one embodiment of the present application provides a method and apparatus for controlling a network slice, and a non-transitory computer-readable storage medium, to implement interconnection of network slices.

At least one embodiment of the present application provides a method for controlling a network slice, including: binding a network slice established in a bearer network on a basis of a quality of service (QoS) requirement to a user network interface or a virtual sub-interface of the bearer network, where a plurality of network slices with different QoS are bound to different user network interfaces or virtual sub-interfaces, and when a first network slice of the bearer network and a network slice group of a non-bearer network are bound to a same user network interface or a same virtual sub-interface, QoS of the first network slice is same as QoS of the network slice group.

At least one embodiment of the present application provides a method for controlling a network slice, including: binding a network slice group of a non-bearer network to a user network interface or a virtual sub-interface of a bearer network, where QoS of the network slice group is same as QoS of the first network slice bound to the user network interface or the virtual sub-interface in the bearer network.

At least one embodiment of the present application provides an apparatus for controlling a network slice, including a memory and a processor, where the memory stores a program which, when executed by the processor, cause the processor to perform the method for controlling a network slice according to any of above embodiments.

At least one embodiment of the present application provides a non-transitory computer-readable storage medium storing at least one program which, when executed by at least one processor, cause the at least one processor to perform the method for controlling a network slice according to any one of above embodiments.

In at least one embodiment of the present application, the network slice is bound to the user network interface or virtual sub-interface, and has the same quality of service as the network slice bound to the same user network interface, realizing interconnection of network slices and ensuring end-to-end Quality of Service (QoS) attributes of traffics.

Other features and advantages of the present application will be set forth in the following description, and will become apparent from the description in part, or be understood by implementing the present application. The objectives and other advantages of the present application may be achieved and obtained by the structures specifically noted in the description, the claims, and the accompanying drawings.

BRIEF DESCRIPTION OF DRAWINGS

The accompanying drawings are intended to provide a further understanding of the technical schemes of the present application and form a part of the specification. The accompanying drawings and the embodiments of the present application are used for explaining the technical schemes of the present application, but are not intended to limit the technical schemes of the present application.

DETAILED DESCRIPTION

In order to make the objectives, technical schemes and advantages of the present application clearer, the following will describe the embodiments of the present application in detail with reference to the accompanying drawings. It should be noted that the embodiments of the present application and the features in the embodiments may be arbitrarily combined with each other without conflict.

The steps shown in the flowchart of the drawings may be performed in a computer system having, such as a set of computer-executable instructions. Although a logical order is shown in the flowchart, in some cases the steps shown or described may be performed in a different order other than the order illustrated.

Figure 1:
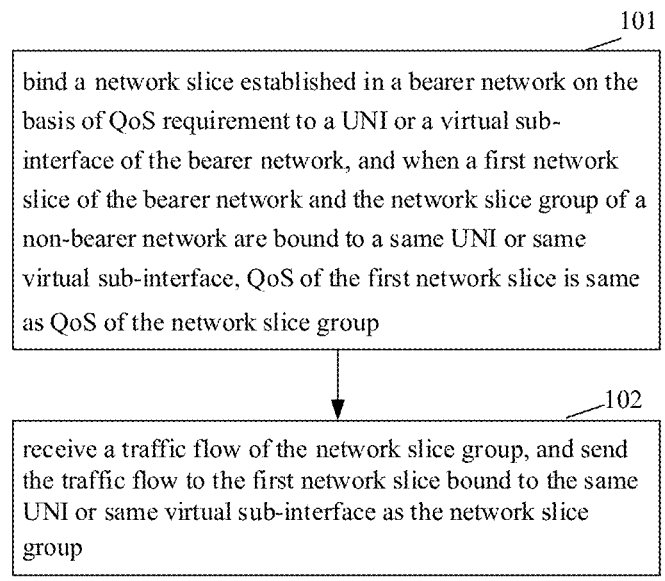
FIG. 1 is a flowchart of a method for controlling a network slice according to an embodiment of the present application.

As shown in FIG. 1, a method for controlling a network slice is provided according to an embodiment of the present application, including a step 101.

At the step 101, a network slice established in a bearer network on the basis of a QoS requirement is bound to a User Network Interface (UNI) or a virtual sub-interface of the bearer network, and a plurality of network slices with different QoS are bound to different UNIs or different virtual sub-interfaces; and when a first network slice of the bearer network and a network slice group of a non-bearer network are bound to the same UNI or virtual sub-interface, QoS of the first network slice is same as QoS of the network slice group.

The above binding relation may be configured by a controller or a network system. When a network slice is bound to a UNI or a virtual sub-interface, it indicates that the network slice transmits traffic flow (receives or sends traffic flow) through the UNI or the virtual sub-interface. In this embodiment, by being bound to the same UNI or virtual sub-interface, QoS association of a plurality of network slices is realized, and end-to-end QoS attributes of traffics can be guaranteed.

UNI is a physical port, while there are two kinds of virtual sub-interfaces: one is a virtual sub-interface divided under a physical port, for example, a virtual local area network interface (i.e., physical port+Virtual Local Area Network (VLAN)) divided according to a VLAN mode; and the other is a virtual sub-interface inside a bearer device, which is the virtual interface inside the device, generally distinguished according to a VLAN mode, and traffics of different VLANs correspond to different virtual sub-interfaces.

The non-bearer network is, for example, a wireless network or a core network.

The step 101 of establishing a network slice in the bearer network on the basis of a QoS requirement includes: establishing one or more network slices, each of which satisfies a QoS requirement, for example, establishing a first slice which satisfies QoS1, establishing a second slice which satisfies QoS2, and so on.

The network slice group includes one or more network slices with same QoS.

In an embodiment, the method further includes a step 102.

At the step 102, a traffic flow of the second network slice is received, and the traffic flow is sent to the first network slice bound to the same UNI or virtual sub-interface as the network slice group.

In an embodiment, when the network slice group is bound to UNI, the step 102 of sending the traffic flow to the first network slice bound to the same UNI or virtual sub-interface as the network slice group includes: sending the traffic flow to the first network slice bound to the user network interface receiving the traffic flow.

In an embodiment, the step 102 of sending the traffic flow to the first network slice bound to the same UNI or virtual sub-interface as the second network slice includes: determining the virtual sub-interface bound to the network slice group according to a virtual local area network (VLAN) information carried in the traffic flow and the UNI receiving the traffic flow, and sending the traffic flow to the first network slice bound to the same virtual sub-interface as the network slice group. The virtual sub-interface is then UNI+VLAN, thus the bound first network slice can be found according to the VLAN information carried in the traffic flow.

In an embodiment, the step of sending the traffic flow to the first network slice bound to the same UNI or virtual sub-interface as the second network slice includes: acquiring first information carried in the traffic flow, taking an internal virtual sub-interface corresponding to the first information as the virtual sub-interface bound to the network slice group, and sending the traffic flow to the first network slice bound to the internal virtual sub-interface, where the QoS of the network slice group is the same as the QoS of the first network slice bound to the internal virtual sub-interface corresponding to the first information.

In this embodiment, the network slice is bound to the internal virtual sub-interface of the device, which is mapped by the first information and the internal virtual sub-interface, the first information is carried in the traffic flow, and the bound internal virtual sub-interface is determined according to the first information. Thus, the device in the bearer network can determine the internal virtual sub-interface corresponding to the first information carried in the traffic flow according to a locally stored mapping relation table of the first information and the internal virtual sub-interface. The device in the bearer network is, for example, a Provider Edge (PE).

In an embodiment, the first information includes at least one of the following: VLAN priority, Differentiated Services Code Point (DSCP) priority, source Internet Protocol (IP) address, and destination IP address. It should be noted that the first information is not limited thereto, but may also be other information.

Figure 2:
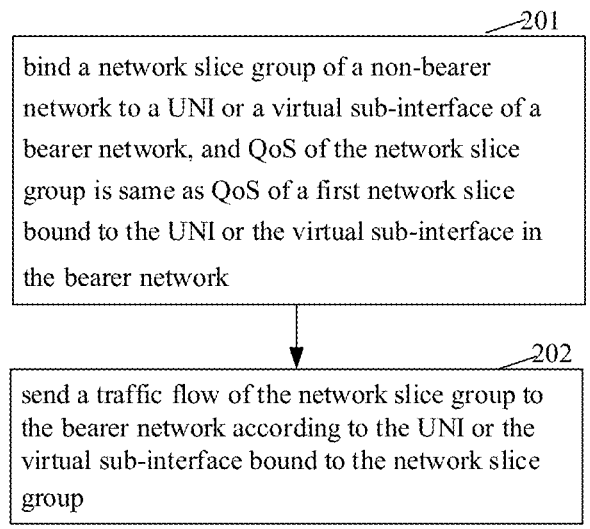
FIG. 2 is a flowchart of a method for controlling a network slice according to another embodiment of the present application.

As shown in FIG. 2, a method for controlling a network slice is provided according to an embodiment of the present application, including a step 201.

At the step 201, a network slice group of a second network is bound to a UNI or a virtual sub-interface of a bearer network, and QoS of the network slice group is the same as QoS of a first network slice bound to the UNI or the virtual sub-interface in the bearer network.

The binding relation may be configured by a network management or a controller of the second network, where the network slice group being bound to a UNI or a virtual sub-interface means that a traffic flow of the network slice group will be transmitted through the corresponding UNI or virtual sub-interface.

In an embodiment, the method further includes a step 202.

At the step 202, a traffic flow of the network slice group is sent to the bearer network according to the UNI or the virtual sub-interface bound to the network slice group.

According to different binding modes, there are several modes to send the traffic flow of the network slice group to the bearer network.

For port mapping mode, the traffic flow is sent to a physical port bound to the network slice group.

For VLAN mapping mode, VLAN information is carried in the traffic flow (the VLAN information indicates the bound virtual sub-interface, that is, the bound virtual sub-interface is port+VLAN information carried in the traffic flow); and then the traffic flow is sent to the bound port (which is bound to port+VLAN, and sent to the corresponding port); after received by the device in the bearer network, the traffic flow is sent to the network slice of the corresponding bearer network according to the VLAN information carried in the traffic flow.

The mapping modes of the first information may include the following two types.

In an embodiment, the first information is VLAN priority, the VLAN priority is carried in the traffic flow, and the traffic flow is sent to the first network slice bound to the internal virtual sub-interface corresponding to the VLAN priority.

In an embodiment, the first information is a source IP address, the source IP address is carried in the traffic flow, and the traffic flow is sent to the first network slice bound to the internal virtual sub-interface corresponding to the source IP address.

In an embodiment, the step 202 of sending the traffic flow of the network slice group to the bearer network according to the UNI or the virtual sub-interface bound to the network slice group may include:

sending the traffic flow of the network slice group to the UNI bound to the network slice group; or carrying a virtual local area network information in the traffic flow of the network slice group, where the virtual local area network information indicates the virtual sub-interface bound to the network slice group, and sending the traffic flow to the bearer network; then what is bound is port+VLAN, and the VLAN information is carried in the traffic flow, so it is only necessary to find the first network slice bound to port+VLAN (carried in the traffic flow) and send the traffic flow to the first network slice. The device in the bearer network can determine the bound first network slice according to the configured binding information of the network slice and the virtual sub-interface; or carrying first information in the traffic flow of the network slice group, where there is a corresponding relation between the first information and the virtual sub-interface; and sending the traffic flow to the bearer network, where the QoS of the network slice group is the same as the QoS of the first network slice bound to the virtual sub-interface corresponding to the first information. After receiving the traffic flow, the device in the bearer network searches the internal virtual sub-interface corresponding to the first information according to the first information carried in the traffic flow, and then sends the traffic flow to the first network slice corresponding to the internal virtual sub-interface. The device in the bearer network can determine the internal virtual sub-interface corresponding to the first information carried in the traffic flow according to the locally stored mapping relation table of the first information and the internal virtual sub-interface.

In an embodiment, the first information includes at least one of a VLAN priority, a DSCP priority, a source IP address and a destination IP address. It should be noted that the first information is not limited thereto, but may also be other information.

Figure 3A:
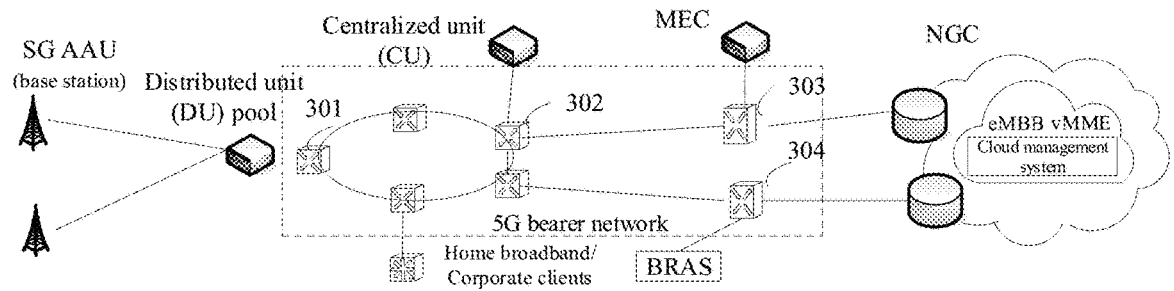
FIG. 3a is a network architecture diagram according to an embodiment of the present application.

FIG. 3*a* is a schematic diagram of a network according to an embodiment of the present application. As shown in FIG. 3*a*, in 5G network, the bearer network establishes a unified transmission channel for Radio Access Network (RAN), home broadband/corporate clients to Next Generation Core (NGC), Mobile Edge Computing (MEC), broadband remote access server (BRAS), etc.

Figure 3B:
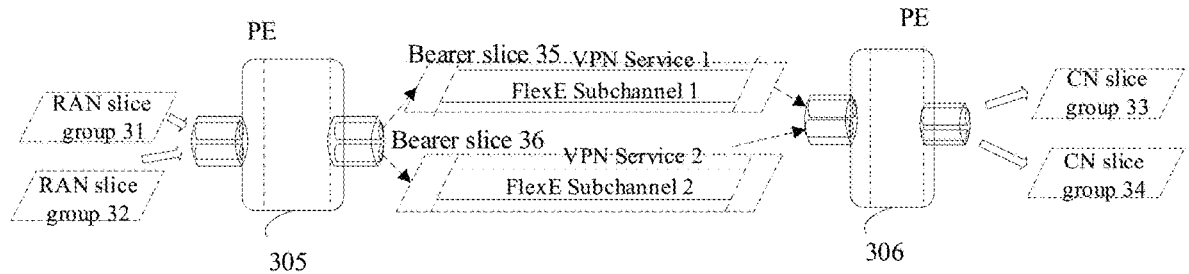
FIG. 3b is a schematic diagram of network slice control according to an embodiment of the present application.

In order to satisfy different types of traffic requirements, functional reconfigurations have been carried out for 5G wireless access network and core network, and different virtual subnets on the same physical network through slicing have been built. As shown in FIG. 3*b*, RAN slice group 31 and RAN slice group 32 are established in the wireless access network, and CN slice group 33 and CN slice group 34 are established in the core network (CN). The bearer network associates and connects these slices in an appropriate way, and guarantees the end-to-end QoS attributes of traffics. In the bearer network, bearer slice 35 (satisfying QoS1) is established and bound to port+VLAN1, and bearer slice 36 (satisfying QoS2) is established and bound to port+VLAN2.

In this embodiment, virtual sub-interfaces bound to slice groups are as follows:

RAN slice group 31 is bound to port+VLAN1, which satisfies QoS1;

RAN slice group 32 is bound to port+VLAN2, which satisfies QoS2;

CN slice group 33 is bound to port+VLAN1, which satisfies QoS1;

CN slice group 34 is bound to port+VLAN2, which satisfies QoS2.

Then, the traffic flow of the RAN slice group 31 is sent to the bearer slice 35 bound to the port+VLAN1, and the QoS of the RAN slice group 31 is same as the QoS of the bearer slice 35, which satisfies the end-to-end QoS requirements of traffics. PE 305 in FIG. 3*b* may be a PE connected to the wireless network in FIG. 3*a*, such as PE 301 and PE 302, etc. PE 306 may be a PE connected to the core network in FIG. 3*a*, such as PE 303 and PE 304, etc.

Figure 4:
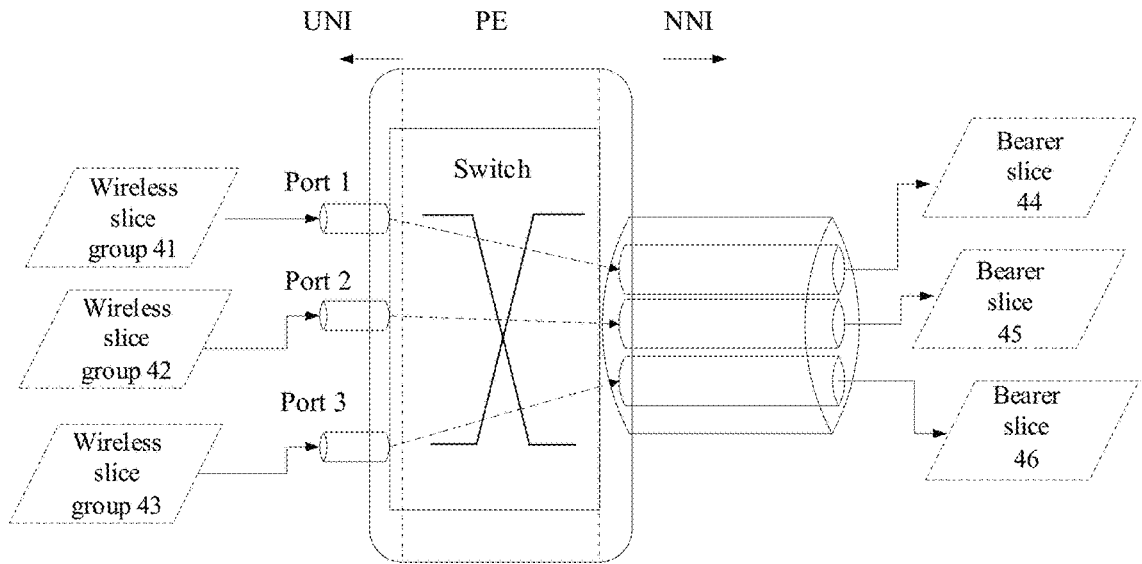
FIG. 4 is a schematic diagram of network slice control (port mapping mode) according to an embodiment of the present application.

FIG. 4 is a schematic diagram of network slice control in port mode according to an embodiment of the present application. The wireless network includes wireless slice group 41 (satisfying QoS1), wireless slice group 42 (satisfying QoS2) and wireless slice group 43 (satisfying QoS3). In the bearer network, bearer slice 44 (satisfying QoS1), bearer slice 45 (satisfying QoS2) and bearer slice 46 (satisfying QoS3) are established on the basis of a QoS requirement. Wireless slice group 41 is bound to port 1 (port 1 is a physical port), and bearer slice 44 satisfying QoS1 is also bound to port 1. Similarly, wireless slice group 42 and bearer slice 45 are bound to port 2 (port 2 is a physical port), and wireless slice group 43 and bearer slice 46 are bound to port 3 (port 3 is a physical port). Because the granularity of wireless network slice is small, wireless slices may be classified according to the QoS attribute of the wireless slices required for transmission, and the wireless slices with the same QoS attribute are aggregated into a slice group, all of which send and receive traffics from the same UNI. In this way, the wireless network slice group selects the corresponding UNI to access the bearer network according to the traffic attribute requirements, thus ensuring the QoS attribute of the traffic. For example, in the wireless network, the traffic flow of wireless slice group 41 is sent to port 1, and after receiving the traffic flow from port 1, the bearer network sends the traffic flow to bearer slice 44 bound to port 1, thus satisfying the QoS attribute of the traffic flow. It should be noted that in the present application, the slice group may also include only one network slice, for example, the wireless network slice group only includes one wireless slice, and the core network slice group only includes one core network slice.

Figure 5:
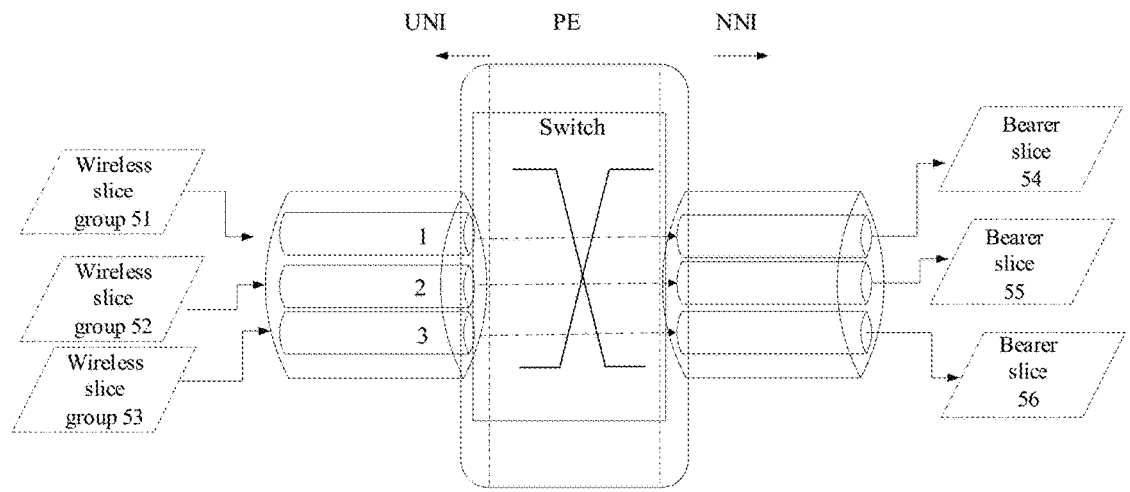
FIG. 5 is a schematic diagram of network slice control (VLAN mapping mode) according to an embodiment of the present application.

FIG. 5 is a schematic diagram of a port+VLAN mapping mode according to an embodiment of the application. As shown in FIG. 5, in this embodiment, the wireless network includes wireless slice group 51 (satisfying QoS1), wireless slice group 52 (satisfying QoS2) and wireless slice group 53 (satisfying QoS3). In the bearer network, bearer slice 54 (satisfying QoS1), bearer slice (satisfying QoS2) and bearer slice 56 (satisfying QoS3) are established on the basis of QoS requirements. Wireless slices 51 is bound to port1+VLAN1, and bearer slice satisfying QoS1 is also bound to port 1+VLAN1. Similarly, wireless slice group 52 and bearer slice 55 are bound to port 1+VLAN2, wireless slice group 53 and bearer slice 56 are bound to port 1+VLAN3. VLAN information (i.e. bound UNI, in this embodiment VLAN1) is carried in the traffic flow of wireless slice group 51 according to the QoS requirement of traffics, and the traffic flow is sent to port 1. After receiving the traffic flow from port 1, the bearer network sends the traffic flow to the bearer slice 54 bound to VLAN1 according to the VLAN information carried in the traffic flow, so as to satisfy the QoS attribute of the traffic flow.

In another embodiment, wireless traffics and the like may be mapped to bearer slices by means of VLAN priority of traffic flow. On the bearer network, bearer slices with different QoS requirements are established according to traffic requirements and bound to different ports+VLANs. The traffic flow of wireless side has VLAN and contains the corresponding 802.1p priority (i.e. VLAN priority). The bearer device (such as PE) may identify the 802.1p priority in the traffic flow by way of, such as Access Control List (ACL), and filter messages. Messages with different VLAN priorities are sent to the corresponding internal virtual sub-interfaces of the device, which are bound to bearer slices. PE can select the corresponding bearer slices according to VLAN priority, so as to ensure the QoS attribute of the traffic. With similar steps, wireless traffics may also be mapped to the corresponding bearer slices through the classification modes such as source IP address, DSCP priority and destination IP address in the traffic flow.

Figure 6:
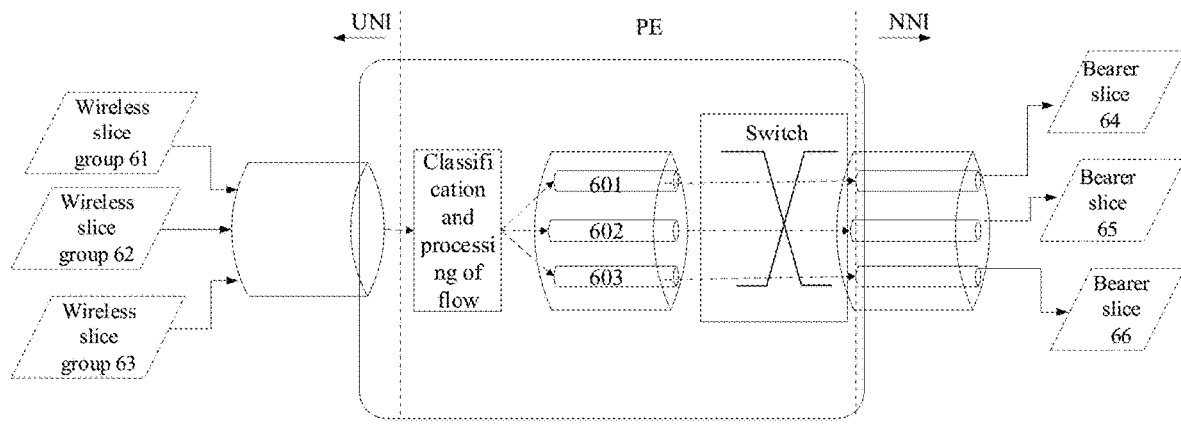
FIG. 6 is a schematic diagram of network slice control (internal virtual sub-interface mode) according to an embodiment of the present application.

As shown in FIG. 6, in this embodiment, the wireless network includes wireless slice group 61 (satisfying QoS1), wireless slice group 62 (satisfying QoS2) and wireless slice group 63 (satisfying QoS3). In the bearer network, bearer slice 64 (satisfying QoS1), bearer slice 65 (satisfying QoS2) and bearer slice 66 (satisfying QoS3) are established on the basis of QoS requirements. Wireless slice group 61 is bound to internal virtual sub-interface 601, and bearer slice satisfying QoS1 is also bound to internal virtual sub-interface 601. Similarly, wireless slice group 62 and bearer slice 65 are bound to virtual sub-interface 602, and wireless slice group 63 and bearer slice 66 are bound to virtual sub-interface 603. VLAN priority 1 corresponds to virtual sub-interface 601, VLAN priority 2 corresponds to virtual sub-interface 602, and VLAN priority 3 corresponds to virtual sub-interface 603. For the traffic flow of wireless slice group 61, according to the UNI bound to the wireless slice group 61 and the corresponding VLAN priority, i.e. VLAN priority 1, VLAN priority 1 is carried in the traffic flow, and the traffic flow is sent to the port of the bearer network. After receiving the traffic flow from the port, the bearer network classifies and processes the traffic flow. For example, according to the VLAN priority carried in the traffic flow, the traffic flow is sent to the corresponding virtual sub-interface. In this embodiment, according to VLAN priority 1 carried in the traffic flow, the traffic is sent to the internal virtual sub-interface 601, and then the traffic flow is sent to the bearer slice 64 bound to the virtual sub-interface 601, so as to satisfy the QoS attribute of the traffic flow.

Figure 7:
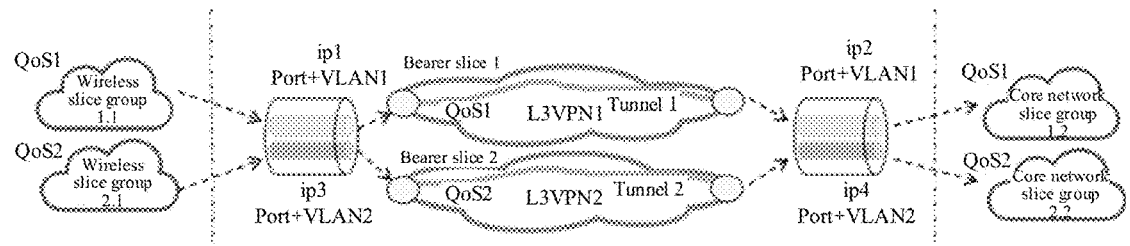
FIG. 7 is a schematic diagram of network slice control according to an embodiment of the present application.

FIG. 7 is a schematic diagram of an interconnection method of network slices according to another embodiment of the present application. In this example, the bearer slicing mode of Layer 3 Virtual Private Network (L3VPN) is adopted, and other bearer slicing modes (such as slicing based on Flex Ethernet (FlexE) channel, Optical Channel Data Unit-k (ODUk), etc.) are similar and will not be repeated herein.

Wireless slices and L3VPN slices are not in one-to-one relation. A plurality of wireless slices with the same transmission QoS requirement are aggregated into a wireless slice group, which may be hosted on a same L3VPN bearer slice with corresponding QoS. Interconnection with different QoS requirements needs to be hosted on different L3VPN slices, so as to ensure the end-to-end QoS requirements of traffics.

As shown in FIG. 7, according to the traffic requirements of the wireless side, L3VPN1 slice is established in the bearer network, and tunnel 1 used in the slice satisfies the QoS1 attribute requirements. The virtual sub-interface bound to the L3VPN1 slice is port+VLAN1, and the IP addresses of the corresponding ports are IP1 and IP2.

L3VPN2 slice is established in the bearer network, and tunnel 2 used in the slice satisfies the QoS2 attribute requirements. The virtual sub-interface bound to the L3VPN2 slice is port+VLAN2, and the IP addresses of the corresponding ports are IP3 and IP4.

Wireless slice group 1.1 is established in the wireless network, and the traffic attribute requirement of the wireless slice group 1.1 is QoS1. The wireless slice group 1.1 is bound to port+VLAN1, so the traffic outer layer of the wireless slice group 1.1 is encapsulated with VLAN1.

Wireless slice group 2.1 is established in the wireless network, and the traffic attribute requirement of the wireless slice group 2.1 is QoS2. The wireless slice group 2.1 is bound to port+VLAN2, so the traffic outer layer of the wireless slice group 2.1 is encapsulated with VLAN2.

Core network slice group 1.2 is established in the core network, and the traffic attribute requirement of the core network slice group 1.2 is QoS1. The core network slice group 1.2 is bound to port+VLAN1, so the traffic outer layer of the core network slice group 1.2 is encapsulated with VLAN1.

Core network slice group 2.2 is established in the core network, and the traffic attribute requirement of the core network slice group 2.2 is QoS2. The core network slice group 2.2 is bound to port+VLAN2, so the traffic outer layer of the core network slice group 2.2 is encapsulated with VLAN2.

After the above settings are completed, the wireless slice group 1.1 on the wireless side and the core network slice group 1.2 on the core network side are interconnected by the bearer slice L3VPN1 satisfying QoS1, to satisfy the end-to-end traffic QoS requirements. The wireless slice group 2.1 on the wireless side and the core network slice group 2.2 on the core network side are interconnected by the bearer slice L3VPN2 satisfying QoS2.

Figure 8:
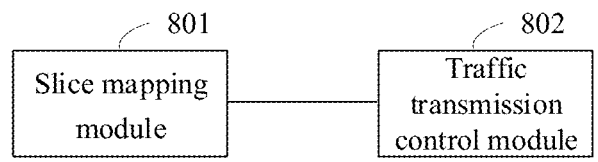
FIG. 8 is a block diagram of an apparatus for controlling a network slice according to an embodiment of the present application.

According to an embodiment of the present application, an apparatus for controlling a network slice is further provided. As shown in FIG. 8, the apparatus includes a slice mapping module 801. The slice mapping module 801 is configured to bind a network slice established in a bearer network on the basis of a quality of service requirement to a UNI or a virtual sub-interface of the bearer network, where a plurality of network slices with different quality of services being bound to different user network interfaces or virtual sub-interfaces, and when a first network slice of the bearer network and a network slice group of a non-bearer network are bound to the same user network interface or virtual sub-interface, the quality of service of the first network slice is the same as the quality of service of the network slice group.

Wireless traffic flows and the like are transmitted to traffic terminals such as core network by way of bearer network traffics, while the main traffic models of packet transmission are L2VPN and L3VPN. For L2VPN, a bearer slice is bound to an Attachment Circuit (AC) port and a Pseudo-Wire (PW). The AC port may be a physical port or a physical port+VLAN, and the PW may be bound to a Label Switch Path (LSP), and its bottom layer may be an independent physical link or FlexE subchannel, or hosted on an ODUk. For L3VPN, a bearer slice is bound to an UNI port or a virtual sub-interface, and an available LSP tunnel is selected. LSP may be hosted on an independent physical link, FlexE sub-channel, ODUk, etc.

In an embodiment, the apparatus further includes a traffic transmission control module 802, which is configured to receive a traffic flow of the network slice group, and send the traffic flow to the first network slice bound to the same user network interface or virtual sub-interface as the network slice group.

In an embodiment, the user network interface bound to the network slice group is a physical port, and the traffic transmission control module 802 is configured to send the traffic flow to the first network slice bound to the physical port receiving the traffic flow.

Alternatively, the virtual sub-interface bound to the network slice group is determined according to the virtual local area network information carried in the traffic flow and the user network interface receiving the traffic flow, and the traffic flow is sent to the first network slice bound to the same virtual sub-interface as the network slice group.

Alternatively, the first information carried in the traffic flow is acquired, the internal virtual sub-interface corresponding to the first information is taken as the virtual sub-interface bound to the network slice group, and the traffic flow is sent to the first network slice bound to the internal virtual sub-interface.

Figure 9:
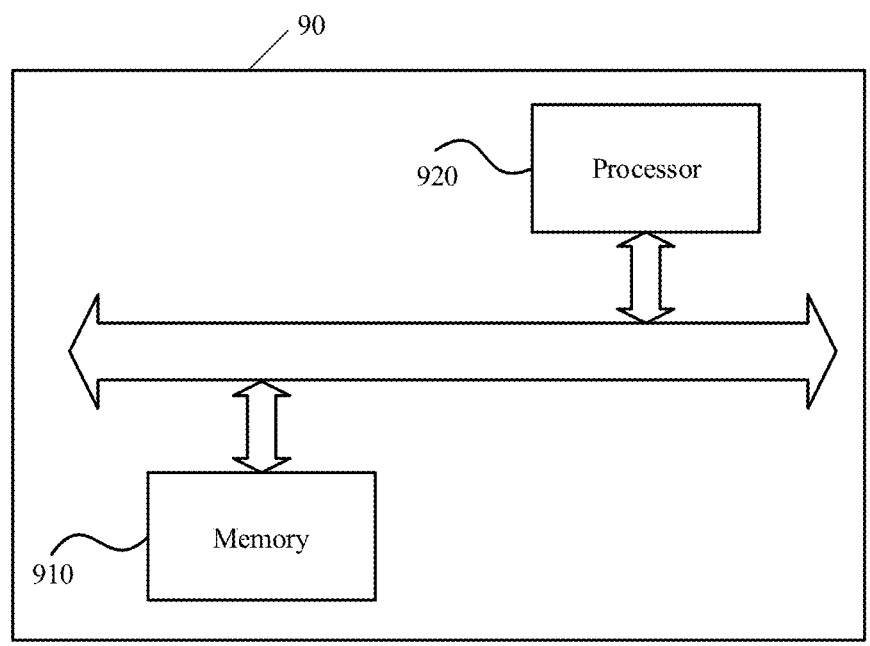
FIG. 9 is a block diagram of an apparatus for controlling a network slice according to an embodiment of the present application.

As shown in FIG. 9, according to an embodiment of the present application, an apparatus 90 for controlling a network slice is provided, including a memory 910 and a processor 920, where the memory 910 stores a program, when the program is read and executed by the processor 920, the method for controlling a network slice described in any of the embodiments is implemented.

According to an embodiment of the present application, a non-transitory computer-readable storage medium is provided, where the non-transitory computer-readable storage medium store one or more programs, which are executable by one or more processors to implement the method for controlling a network slice described in any of the embodiments.

The non-transitory computer-readable storage medium includes a USB flash drive, a read-only memory (ROM), a random access memory (RAM), a removable hard disk, a magnetic disk, an optical disc, or any other medium that can store program code.

Those of ordinary skill in the art will appreciate that all or some of the steps of the methods disclosed above, functional modules/units in the system, apparatus may be implemented as software, firmware, hardware, and appropriate combinations thereof. In a hardware implementation, partitioning between functional modules/units mentioned in the above description does not necessarily correspond to partitioning of physical components, for example, a physical component may have multiple functions, or a function or step may be performed by several physical components in cooperation. Some or all components may be implemented as software executed by a processor, such as a digital signal processor or a microprocessor, or as hardware, or as an integrated circuit, such as an application-specific integrated circuit. Such software may be distributed over non-transitory computer-readable media, which may include computer storage media (or non-transitory media) and communication media (or transitory media). As known to those of ordinary skill in the art, the term computer storage medium includes volatile and non-volatile, removable and non-removable media implemented in any method or technique for storing information, such as non-transitory computer-readable instructions, data structures, program modules or other data. Computer storage media include, but are not limited to, RAMs, ROMs, EEPROMs, flash memory or other memory technologies, CD-ROM, digital versatile disks (DVD) or other optical disk storage, magnetic cassettes, magnetic tapes, magnetic disk storage or other magnetic storage devices, or any other media that may be used to store desired information and that may be accessed by a computer. Furthermore, as is well known to those of ordinary skill in the art, a communication medium typically contains non-transitory computer-readable instructions, data structures, program modules, or other data in a modulated data signal such as a carrier wave or other transmission mechanism, and may include any information delivery medium.

Although the embodiments disclosed in the present application are as above, the described contents are merely embodiments adopted for convenience of understanding the present application, and are not intended to limit the present application. Any person skilled in the art to which this application relates may make any modifications and changes in the form and details of the application without departing from the principle and scope disclosed herein, provided that the scope of patent protection of this application shall be subject to the scope defined in the appended claims.

The invention claimed is:

1. A method for controlling a network slice, comprising:
   binding a network slice established in a bearer network on a basis of a quality of service (QoS) requirement to a user network interface or a virtual sub-interface of the bearer network;
   receiving a traffic flow of the network slice group; and
   sending the traffic flow of the first network slice bound to the same user network interface or the same virtual sub-interface as the network slice group;
   wherein a plurality of network slices with different QoS are bound to different user network interfaces or virtual sub-interfaces, and when a first network slice of the bearer network and a network slice group of a non-bearer network are bound to a same user network interface or a same virtual sub-interface, QoS of the first network slice is same as QoS of the network slice group; and wherein the step of sending the traffic flow to the first network slice bound to the same user network interface or the same virtual sub-interface as the network slice group comprises:
  determining the virtual sub-interface bound to the network slice group according to a virtual local area network information carried in the traffic flow and the user network interface receiving the traffic flow, and
  sending the traffic flow to the first network slice bound to the same virtual sub-interface as the network slice group.

2. The method for controlling a network slice of claim 1, wherein the step of sending the traffic flow to the first network slice bound to the same user network interface or the same virtual sub-interface as the network slice group comprises:
  sending the traffic flow to the first network slice bound to the user network interface receiving the traffic flow.

3. The method for controlling a network slice of claim 1, wherein the step of sending the traffic flow to the first network slice bound to the same user network interface or the same virtual sub-interface as the network slice group comprises:
  acquiring first information carried in the traffic flow, taking an internal virtual sub-interface corresponding to the first information as the virtual sub-interface bound to the network slice group, and
  sending the traffic flow to the first network slice bound to the internal virtual sub-interface.

4. The method for controlling a network slice of claim 3, wherein the first information comprises at least one of a virtual local area network priority, a differentiated services code point priority, a source internet protocol (IP) address and a destination IP address.

5. A method for controlling a network slice, comprising:
  binding a network slice group of a non-bearer network to a user network interface or a virtual sub-interface of a bearer network; and
  sending a traffic flow of the network slice group to the bearer network according to the user network interface or the virtual sub-interface bound to the network slice group;
  wherein quality of service (QoS) of the network slice group is same as QoS of the first network slice bound to the user network interface or the virtual sub-interface in the bearer network; and
  wherein the step of sending the traffic flow of the network slice group to the bearer network according to the user network interface or the virtual sub-interface bound to the network slice group comprises:
    sending the traffic flow of the network slice group to a physical port bound to the network slice group; or
    carrying a local area network information in the traffic flow of the network slice group, wherein the local area network information indicates the virtual sub-interface bound to the network slice group, and sending the traffic flow to the bearer network; or
    carrying first information in the traffic flow of the network slice group, wherein the first information has a corresponding relation with the virtual sub-interface; and sending the traffic flow to the bearer network, wherein QoS of the network slice group is same as QoS of the first network slice bound to the virtual sub-interface corresponding to the first information.

6. The method for controlling a network slice of claim 5, wherein the first information comprises at least one of a virtual local area network priority, a differentiated services code point priority, a source internet protocol (IP) address, and a destination IP address.

7. An apparatus for controlling a network slice, comprising a memory and a processor, wherein the memory stores a program which, when executed by the processor, cause the processor to perform a method for controlling a network slice comprising:
  binding a network slice established in a bearer network on a basis of a quality of service (QoS) requirement to a user network interface or a virtual sub-interface of the bearer network;
  receiving a traffic flow of the network slice group; and
  sending the traffic flow to the first network slice bound to the same user network interface or the same virtual sub-interface as the network slice group;
  wherein a plurality of network slices with different QoS are bound to different user network interfaces or virtual sub-interfaces, and when a first network slice of the bearer network and a network slice group of a non-bearer network are bound to a same user network interface or a same virtual sub-interface, QoS of the first network slice is same as QoS of the network slice group; and
  wherein the step of sending the traffic flow to the first network slice bound to the same user network interface or the same virtual sub-interface as the network slice group comprises:
    determining the virtual sub-interface bound to the network slice group according to a virtual local area network information carried in the traffic flow and the user network interface receiving the traffic flow, and
    sending the traffic flow to the first network slice bound to the same virtual sub-interface as the network slice group.

8. A non-transitory computer-readable storage medium storing at least one program which, when executed by at least one processor, cause the at least one processor to perform a method for controlling a network slice comprising:
  binding a network slice established in a bearer network on a basis of a quality of service (QoS) requirement to a user network interface or a virtual sub-interface of the bearer network;
  receiving a traffic flow of the network slice group; and
  sending the traffic flow to the first network slice bound to the same user network interface or the same virtual sub-interface as the network slice group;
  wherein a plurality of network slices with different QoS are bound to different user network interfaces or virtual sub-interfaces, and when a first network slice of the bearer network and a network slice group of a non-bearer network are bound to a same user network interface or a same virtual sub-interface, QoS of the first network slice is same as QoS of the network slice group; and
  wherein the step of sending the traffic flow to the first network slice bound to the same user network interface or the same virtual sub-interface as the network slice group comprises:
    determining the virtual sub-interface bound to the network slice group according to a virtual local area network information carried in the traffic flow and the user network interface receiving the traffic flow, and sending the traffic flow to the first network slice bound to the same virtual sub-interface as the network slice group.

\* \* \* \* \*